Jan 6, 1931.   I. R. HIPPENMEYER   1,787,983
BOTTLE WASHING APPARATUS
Original Filed June 9, 1924   6 Sheets-Sheet 1

Jan 6, 1931.  I. R. HIPPENMEYER  1,787,983
BOTTLE WASHING APPARATUS
Original Filed June 9, 1924   6 Sheets-Sheet 2

Inventor
Irving R. Hippenmeyer
By Chindahl Parker & Carlson
Attys.

Jan 6, 1931.  I. R. HIPPENMEYER  1,787,983
BOTTLE WASHING APPARATUS
Original Filed June 9, 1924   6 Sheets-Sheet 4

Fig. 4.

Inventor:
Irving R. Hippenmeyer,
By Chindahl Parker Carlson
Attys.

Jan 6, 1931.    I. R. HIPPENMEYER    1,787,983
BOTTLE WASHING APPARATUS
Original Filed June 9, 1924    6 Sheets-Sheet 6

Inventor:
Irving R. Hippenmeyer,
By Chindall Parker Carlson
attys.

Patented Jan. 6, 1931

1,787,983

UNITED STATES PATENT OFFICE

IRVING R. HIPPENMEYER, OF WAUKESHA, WISCONSIN, ASSIGNOR TO THE CREAMERY PACKAGE MFG. COMPANY, OF CHICAGO, ILLINOIS, A CORPORATION OF ILLINOIS

BOTTLE-WASHING APPARATUS

Original application filed June 9, 1924, Serial No. 718,688. Divided and this application filed October 10, 1927. Serial No. 225,132.

The invention relates to machines for washing bottles and more particularly to devices for introducing bottles into and receiving bottles from the treating apparatus in machines of the type set forth in my copending application Serial No. 718,688, filed June 9th, 1924, and from which application this application has been divided.

It is the principal object of this invention to provide a machine in which bottles automatically progress through a series of compartments wherein they are subjected to a succession of cleansing treatment applications and with which is incorporated automatic synchronously operating devices for introducing the bottles into the treating compartments and for receiving the cleansed bottles therefrom, and which devices are adapted for co-operation with continuous conveyors for handling the bottles to and from the machine.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the spirit and scope of the invention as expressed in the appended claims.

Referring to the drawings.

Stated generally, the machine comprises a sectionally constructed tank having a series of compartments. Each compartment houses a wheel, the several wheels being mounted on a common shaft and rotatable in synchronism. Groups of bottle retaining pockets are carried by each of the wheels, the pockets of each group being arranged in substantially radial formation and inclined to the plane of rotation of the wheels. An alined series of openings through the partitions between the several compartments provides for the passage of the bottles from the pockets of one wheel to those of the next succeeding wheel, as the pockets move into register with the openings. At the front end of the machine is provided a device for receiving the bottles from a continuous conveyor, the device being operable to elevate the bottles in groups corresponding to the pockets of the wheels and slide them in timed sequence, through the openings provided in the end wall of the tank, into the successive groups of pockets moving past the openings. The bottles so positioned in the pockets of the first wheel are carried through one revolution of the wheel, during which movement they are passed through a bath of cleansing solution contained in the lower portion of the tank, and drained during their movement through the upper arc of the revolution of the wheel. As the bottles successively reach the openings in the first partition, the inclined position of the pockets causes them to slide by gravity through the openings into the registering pockets of the wheel in the second compartment. The second wheel carries them through a full revolution and drops them in like manner into the third wheel, and so on through the machine.

The compartments are arranged to provide, first, a succession of soaking baths in cleansing solution, then a rinsing spray bath, followed by a sterilizing bath of live steam. The succeeding compartments are provided with cooling sprays of progressively lowered temperature which gradually cool the bottles to the desired finishing temperature.

At the rear end of the machine is a receiving device into which the groups of bottles are dropped through the openings in the end wall of the machine, and by which they are lowered into upright position upon a belt conveyor arranged to conduct the bottles to the filling machines.

The specific structure and function of the treating compartments being fuly described in my copending application above referred to the further detailed description of that part of the machine will not be set forth herein except as may be necessary to fully describe the subject matter of this divisional application.

Figure 1:
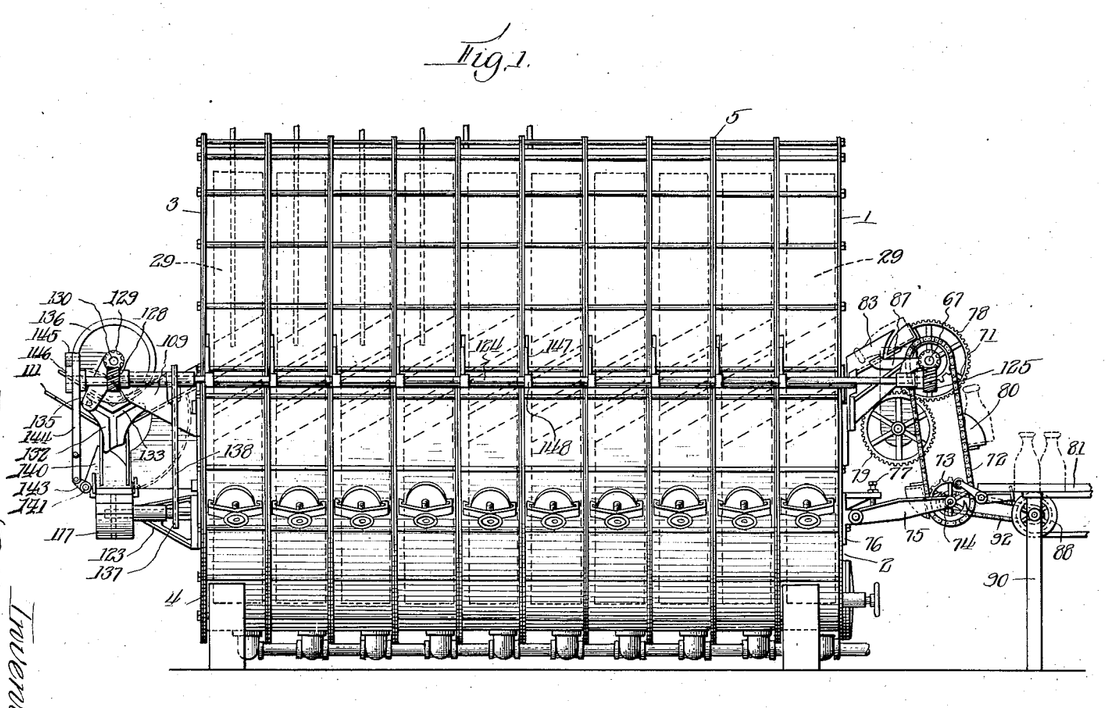
Figure 1 is a side elevation of the machine.
Figure 2:
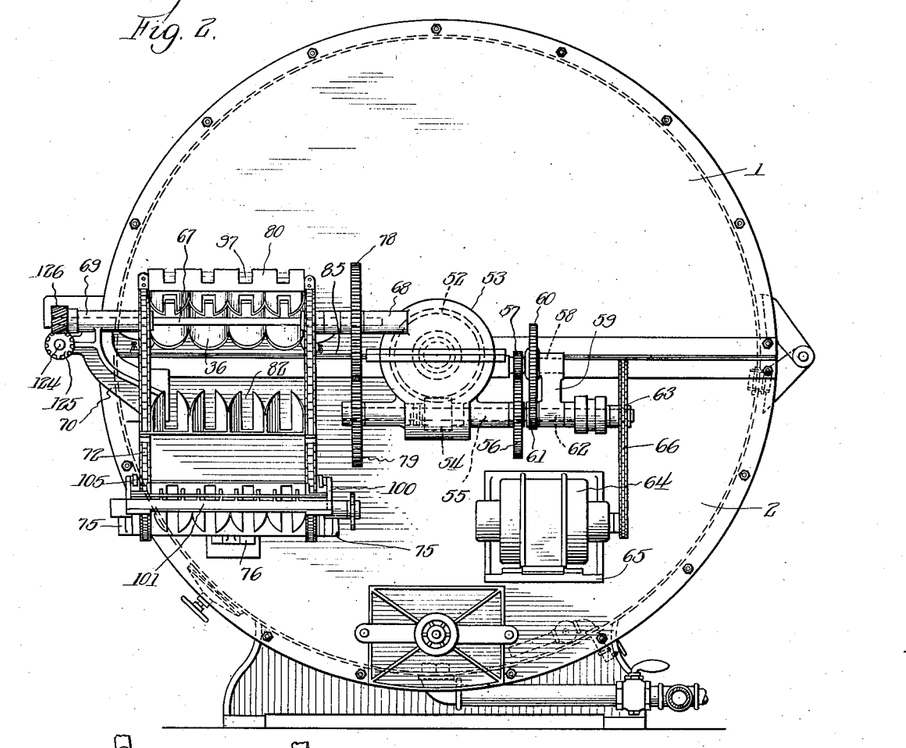
Fig. 2 is a front end elevation.
Figure 3:
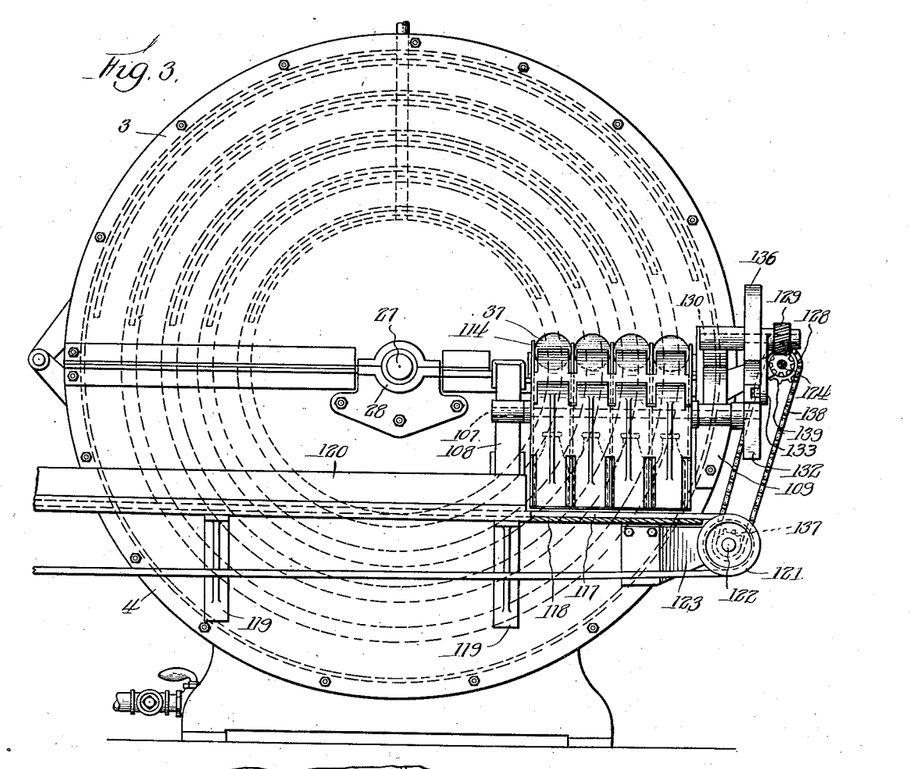
Fig. 3 is a rear end elevation showing the bottle receiving device partially in section.

A horizontal shaft 27 is positioned axially of the several treating compartments and provided with suitable bearings mounted on the end walls of the tank structure as indicated at 28 in Fig. 3. In each compartment is a wheel 29 mounted on the shaft 27, the wheels being keyed or otherwise rigidly secured thereto and spaced one from the other by suitable spacer sleeves 30, assuring the positioning of the wheels for free rotation between the walls of the several compartments. The wheels are preferably of spoke construction, the outer ends of the spokes carrying concentric flanges 31.

Figure 4:
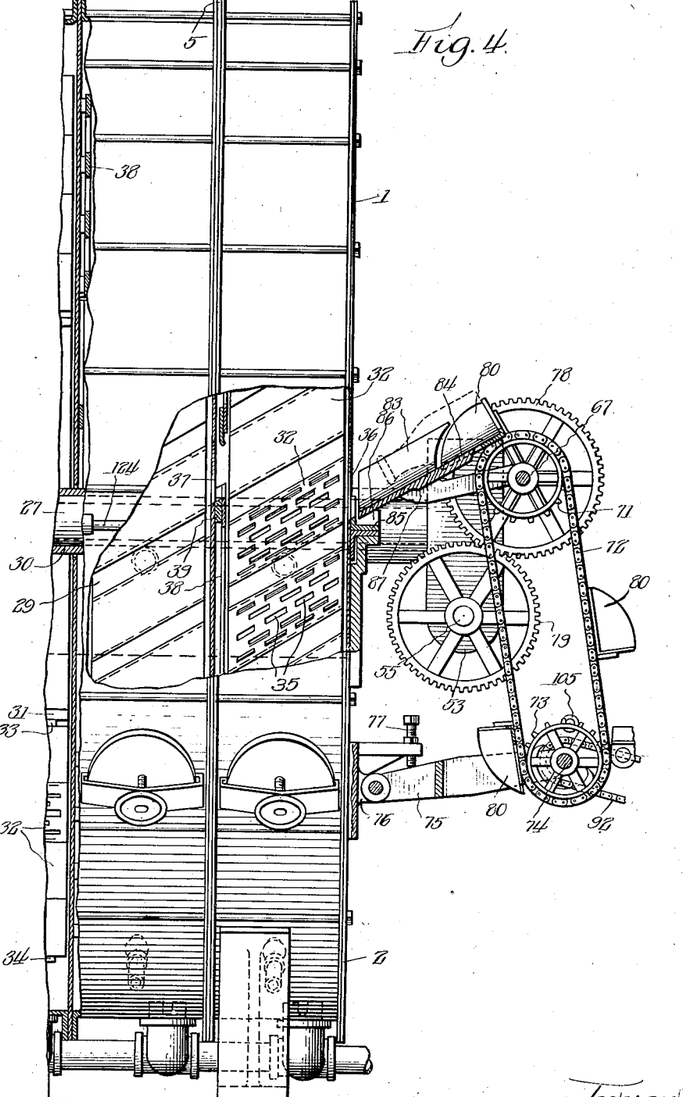
Fig. 4 is a side elevation of the front end portion of the machine with a portion of its outer wall broken away to illustrate the internal conveying means.
Figure 5:
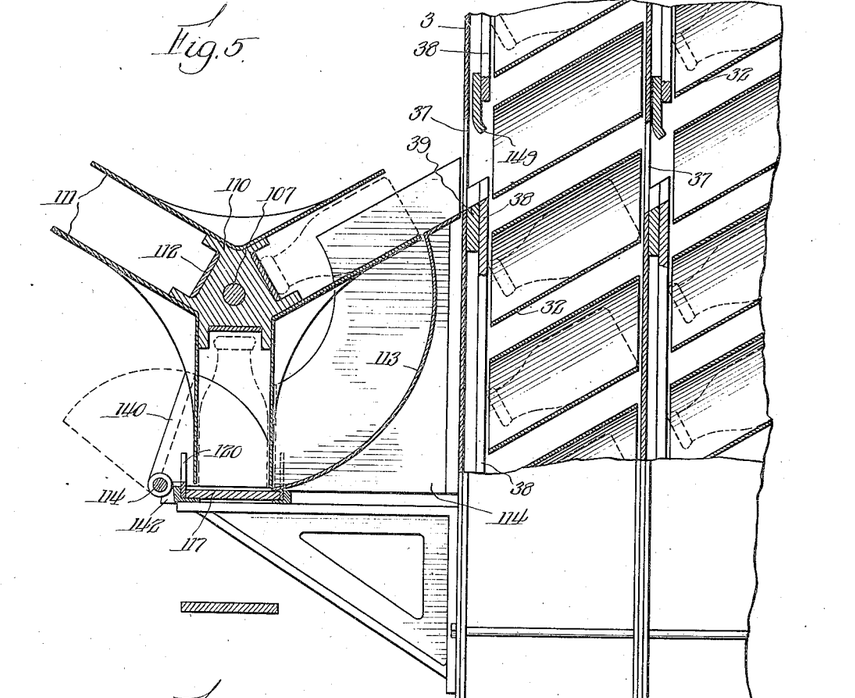
Fig. 5 is a fractional side elevation of a portion of the rear end of the machine showing portions thereof in vertical section.
Figure 6:
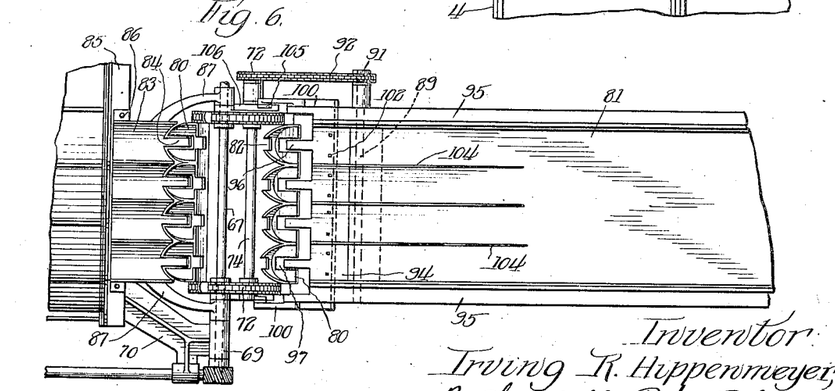
Fig. 6 is a detailed plan view of the bottle introducing device.
Figure 7:
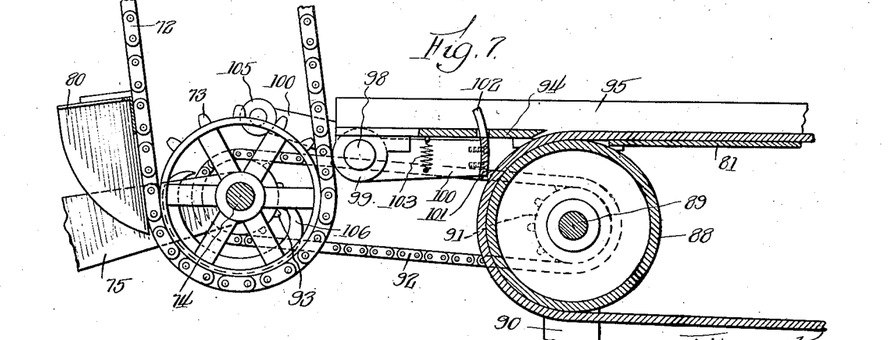
Fig. 7 is a sectional detail of a portion of the latter.
Figure 8:
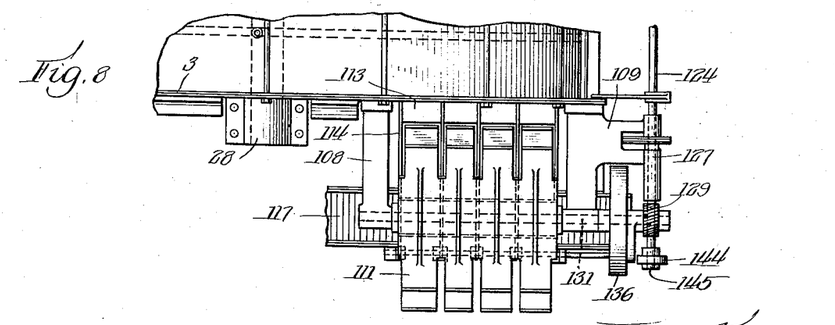
Fig. 8 is a detailed plan view of the bottle receiving device at the rear end of the machine.
Figure 9:
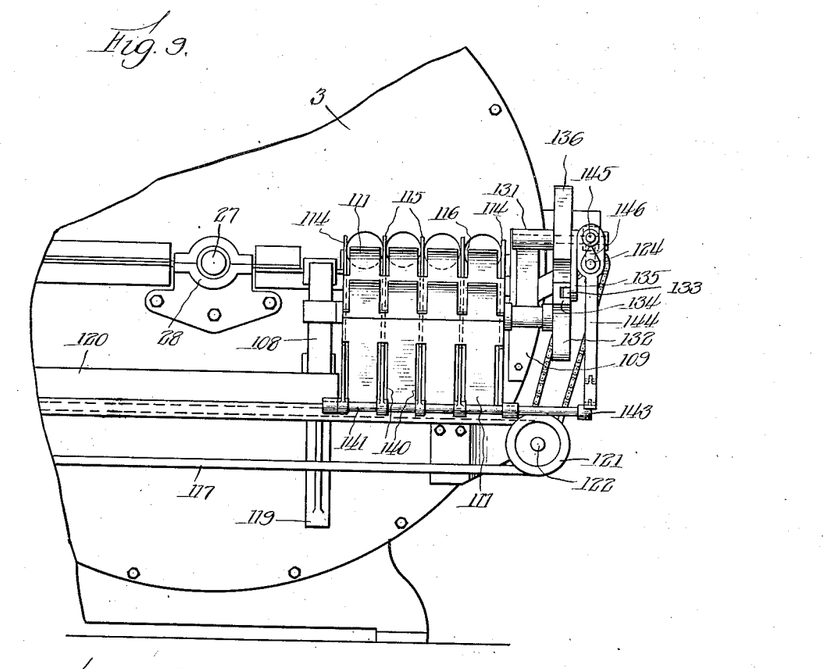
Fig. 9 is an end elevation in full of the bottle receiving device.

Each of the wheels 29 carries a series of radially positioned groups of open-end bottle pockets. As illustrated herein, each group comprises four bottle pockets 32 secured laterally to each other and supported inwardly by a pair of annular bands 33 fastened to the flanges 31 and to the inner one of each group of pockets, and outwardly supported by a pair of annular binding bands 34, (Fig. 4) to which the outer one of each group of pockets is secured, the whole comprising a rigid structure rotatable by the shaft 27. The pockets are positioned with their longitudinal axes in substantially concentric relation to the axis of the shaft, but angularly inclined to a plane perpendicular to the axis of the shaft. The pockets are preferably provided with a plurality of lateral openings 35 permitting access to the bottles contained in the pockets for the soaking solution and spray baths by which the bottles are treated in their progress through the machine.

The upper portion 1 of the front end wall is provided with a horizontally arranged series of openings 36, with which the passing retainer pockets 32 on the first wheel successively register in their movement around the first compartment. Similar openings 37 are formed in each of the partition walls 5 and in the rear end wall 3, all of the openings 37 being horizontally alined with the openings 36 in the front end wall. By means hereinafter described, groups of four bottles each are dropped through the openings 36 in the front end wall at the moment the successive groups of four retaining pockets register with the openings 36. The inclination of the retaining pockets 32 is such that when the upper ends of the pockets in each group are in register with the openings 36, the lower ends of the pockets are below the alined openings 37 in the adjacent partition wall, the bottles thereby being retained in the pockets until they have completed a revolution through the compartment and their lower ends pass successively into register with the opening 37.

Mounted on the frontward side of each partition wall and the rear end wall are concentric series of abutment plates 38 positioned respectively opposite the rear ends of the pockets 32, and preferably spaced from the walls by cushioning members 39. The abutment plates are so positioned that when the bottles are admitted to the pockets they slide through into contact with the abutment plates, and the resilient support of the latter prevents chipping of the mouths of the bottles. They also serve the function in their contact with the corners of the angularly positioned bottles, to rotate the latter in the pockets and facilitate the free application of the washing solution and spray to all portions of the bottles.

While thus retained in the pockets the bottles are carried downward and subjected to the treatment provided in that compartment and then upward and through the upper arc of revolution of the wheel 29. As the bottles reach the openings 37 in the first partition wall they slide through into the retaining pockets 32 carried by the supporting wheel in the second compartment, the pockets in the second compartment being so positioned on their support that their upper ends will be in register with the openings 37 in synchronism with the lower ends of the retaining pockets of the wheel in the first compartment. After treatment in the second compartment the bottles progress similarly into the third and other successive compartments of the machine.

The rotation of the shaft 27, with the bottle carrying wheels supported thereon, is accomplished as illustrated herein, by a worm wheel 52 mounted on the front end of the shaft exteriorly of the tank and enclosed within a casing 53, secured to the lower portion of the front end wall of the tank. The casing 53 also encloses a worm 54 engaging the worm wheel 52 and mounted on a shaft 55, the latter being journalled in the casing and carrying at its outward end a spur gear 56.

A pinion 57 mounted on a stub shaft 58, having its bearing in a bracket 59, is rotatable in rigid relation to the spur gear 60, also mounted on the stub shaft 58, the gear 60 being driven by a pinion 61, mounted on a shaft 62 having its bearing in the bracket 59 and carrying at its opposite end a sprocket 63. An electric motor 64, suitably mounted on a bracket 65 secured to the end wall of the tank, supplies power through the chain 66, to the sprocket 63.

The bottles are introduced into the first soaking tank by means of a feeding device located at the front end of the machine and adapted to take the bottles from a belt conveyor, elevate them in groups of four, and intermittently slide them through the openings 36 in the front end wall, synchronously with the successive passing of the groups of bottle pockets 32. The feeding device comprises a shaft 67, journalled at its inner end in a bearing 68, preferably formed on the worm gear casing 53. The outer end of the shaft is supported in a bearing 69, carried by the bracket 70, secured to the lower portion 2 of the front end wall. A pair of sprockets 71, secured on the shaft 67 intermediate of its bearings, carry respectively a pair of sprocket chains 72. The sprocket chains 72 are supported at the lower ends of their runs on a pair of sprockets 73, mounted on a shaft 74, journalled in the arms of a bearing yoke 75, pivotally supported on a bracket 76, secured to the end wall 2. The yoke 75 is arranged to be swung on its pivotal support to take up any slack developing in the chains 72, and is adjustably positioned by means of a set screw 77, bearing on the upper side of the yoke and supported in a rigid extension of the bracket 76.

The shaft 67 carries a rigidly mounted gear 78, adjacent its inner bearing 68, which is in driven engagement with a gear 79 mounted on the extended end of the worm shaft 55, thereby receiving power from the motor 64 for the operation of the chains. The chains 72 are provided at spaced intervals with cross connected elevating members 80. Each of the latter is arranged to receive and support a group of four bottles taken from a conveyor belt 81 as the bottles are advanced thereon into engagement with the cross members 80. The latter are each constructed with a bottom supporting plate and with an upright curved lateral support forming four pockets for the reception of the bottles, the lateral support having vertical slots 82 positioned centrally of the respective pockets. As the bottles are propelled into the pockets on the members 80, they are elevated by means of the chains 72, and pass over the upper sprockets 71, whereby they are turned rearwardly downward at a sufficient angle for the bottles to slide by gravity from the members 80 onto a guide member 83, having four channels adapted to receive the bottles and direct them through the openings 36 into the rotating pockets in the first soaking compartment.

To assure the sufficient under-support of the bottles to avoid their tipping back upon the elevating members 80, the guide member 83 is provided with extended tongues 84, positioned centrally of each of the channels in the guide member and protruding into the path of the elevating members 80, passing through the slots 82 in the latter as the elevating members are carried over the upper sprockets. The guide member 83 is supported at its inner edge upon a flange 85 mounted on the end wall of the tank, and may be adjusted in relation to the openings 36 by means of a pair of set screws positioned in the lateral lugs 86 carried by the member 83, the set screws bearing upon the flange 85. The guide member 83 is outwardly supported by means of a pair of brackets 87, positioned laterally of the member 83 in fixed attachment thereto and having outer bearings on the shaft 67. Thus supported the member 83 is always in correct relation to the elevating members 80 as they pass over the sprockets 71.

As illustrated herein the adjacent end of the conveyor belt 81 is operatively supported on a roller 88 carried by a shaft 89 having its bearings in suitable standards 90. The shaft 89 carries at its outer end a sprocket 91, having driven connection through the chain 92 with a sprocket 93 mounted on the outer end of the shaft 74.

Associated with the conveyor is a stationary receiving plate 94, positioned on the same plane with the conveying run of the conveyor belt and secured to a pair of lateral guide members 95 supported on the standards 90. The edge of the receiving plate 94 facing the elevating device is provided with a series of spaced tongues 96, which protrude into the path of the bottle elevating members 80, in the bottom plates of which latter are provided slots 97 through which the tongues 96 pass in the movement of the elevating members. The bottles are propelled by the conveyor belt 81 across the receiving plate 94, and over the tongue portions 96 into position for engagement by the elevating members as they are carried upward on their supporting chains.

The bottles are advanced in time with the passage of the respective bottle elevating members by means of a reciprocating stop mechanism, which operates to normally hold back the bottles and release them in groups of four for advancement into position for engagement by the elevating members. The stop mechanism comprises a pair of stub shafts 98 secured in a pair of brackets 99 mounted on the respective guide members 95, each stub shaft carrying a centrally pivoted lever 100. A cross bar 101 is secured to the front ends of the two levers 100, the bar extending beneath the plate 94 and having upwardly projecting prongs 102 operable through apertures in the plate 94 into the path of the bottles passing over the latter. The prongs 102 are normally maintained in upper position by means of a pair of springs 103 secured to the plate 94 and attached to the respective levers 100. Intermediate spaced guides 104, secured to the plate 94 and extending over the conveyor belt 81, are preferably provided to divide the space between the lateral guides 95 into four runways leading to the elevating device. A pair of the prongs 102 are positioned in each runway.

Mounted on the opposite ends respectively of the levers 100, are a pair of pivoted rollers 105 positioned for engagement respectively by a pair of cams 106, rigidly mounted on the lower chain supporting sprockets 73. The prongs 102 normally extend through the receiving plate 94 and prevent the advancement of the bottles by the conveyor through the runways. As each of the bottle elevating members pass around the lower sprockets and approach the receiving plate 94 on their upward run, the cams 106 engage the rollers 105, swinging the levers 100 and bar 101 into position to withdraw the prongs 102 from above the receiving plate, and permit the advancement of one bottle in each of the four runways, whereupon the rollers 105 are released from the cam and the prongs raised again in the path of the succeeding bottles to prevent their further advancement until the approach of the next bottle elevating member.

The feeding device just described accomplishes the wholly automatic feeding of the bottles into the machine from the continuous conveying belt, timing the delivery of the bottles to the passage of the successive groups of pockets 32 in the first soaking tank.

A receiving device is provided at the rear end of the machine to receive the bottles from the final cooling compartment and deliver them in upright position upon a continuous conveyor for carrying the bottles to a filling machine. The receiving device comprises a shaft 107, having end bearings respectively in the brackets 108 and 109, secured to the rear end wall of the machine.

Rigidly supported on the shaft 107 is a hub member 110 to which are secured radially arranged pocket forming plates 111, which operate with the rotation of the shaft to successively present their open ends before the openings 37 in the rear end wall of the machine, in position to receive the successive groups of bottles as they are discharged from the final cooling compartment.

A cushion 112 mounted on the hub 110 at the inner end of each of the receiving pockets may be provided to prevent chipping of the bottles as they slide into the pockets and abut the hub member.

The bottles are retained in the radial pockets during the rotation of the latter, by means of a concentric plate 113, positioned outward of the path of the ends of the pocket walls 111 and supported by end plates 114 secured to the end wall of the tank. Partition plates 115 are also provided, which form individual runways for the bottles of the groups of four as discharged from the machine, and which extend into slots 116 provided in the walls 111 forming the radial pockets.

Adjacently beneath the ends of the radial pockets in their lowermost position is a conveyor belt 117, travelling upon the supporting plate 118 mounted on the brackets 119 secured to the end wall 4, the supporting plate 118 preferably having side guide members 120 attached thereto. The conveyor belt 117 is operatively supported upon a roller 121 mounted on a shaft 122, having its supporting bearing in a bracket 123 mounted on the end wall 4. The conveyor 117 travels beneath the pockets in the direction of the axis of the shaft 107, and operates to remove the bottles laterally from the pockets when they are lowered into position over the conveyor.

The bottle receiving device is operated by means of a shaft 124 extending longitudinally of the machine and supported at its front end in a bearing formed in an extension of the bracket 70, mounted on the front end wall of the machine.

A spiral gear 125 rigidly mounted at the front end of the shaft 124 is in driven engagement with a spiral gear 126 secured on the outer end of the drive shaft 67, in the bottle feeding device. The rear end of the shaft 124 is supported in a bearing 127, carried by a lateral extension of the bracket 109. A spiral gear 128 rigidly mounted on the rear end of the shaft 124, engages a spiral gear 129 mounted on a stub shaft 130, having its bearing 131 in an upward extension of the bracket 109.

The intermittent movement of the receiving pockets carried by the shaft 107, is effected by means of the star shaped member 132 rigidly mounted on the outer end of the shaft 107, and having radially arranged lateral slots 133. The member 132 is intermittently moved through a portion of a revolution by means of a roller 134, pivoted on the lever arm 135, rigidly mounted on the stub shaft 130 and engaging successively the slots 133 in the rotation of the stub shaft 130. The intermediate positions of rest of the star member 132 are maintained by means of the arcuately recessed cam 136, carried by the shaft 130. The normal circular periphery of the cam 136 engages the concentrically recessed periphery of the star wheel 132, except during the engagement therewith of the roller 134, when the cam recess is in position for the passage therethrough of the adjacent arm of the star wheel. By this means the radial pockets formed by the walls 111 are successively presented to the discharge openings 37 in the end wall in time to receive the bottles therefrom, as they slide out of the respective pockets in the final cooling compartment, and are then swung downwardly into upright position upon the conveyor belt 117.

The conveyor belt 117 is operated by means of the sprocket 137 mounted on the roller supporting shaft 122 and in driven connection through the chain 138 with a sprocket 139 mounted on the shaft 124. The speed of the conveyor belt 117 is so arranged that the bottles will be removed from the radial pockets during the period of rest of the latter.

As the bottles are lowered in the radial pockets and deposited on the conveyor belt 117 there is a tendency to upset the bottles in their first contact with the conveyor. The bottles are prevented from being so upset by means of a series of movable wings 140 which are operable through the slots 116 in the walls of the radial pockets, the wings being swung into position between the several bottles across the conveyor belt at the moment the bottles are deposited on the conveyor, and immediately thereafter withdrawn.

The wings 140 are each supported on a shaft 141 having suitable bearings 142 mounted on the outer guide rail 120 of the conveyor. The shaft 141 carries a rocker arm 143 rigidly secured thereto, to the free end of which is pivotally connected a bar 144, extending upwardly and having a longitudinally slotted end portion embracing the extended end of the shaft 124. A pivoted roller 145 is mounted on the bar 144 above the slot adapted for engagement by a cam 146, rigidly mounted on the shaft 124, and so arranged that in the rotation of the latter, the bar 144 is lifted and the shaft 141 operated to swing the wings 140 across the conveyor 117 at the moment the bottles are deposited thereon, thus preventing their falling laterally.

Due to the shape of the standard milk bottle with its larger lower diameter forming a shoulder, it is desirable to provide for the release of the bottles for passage from one compartment to another in such time that they will slide freely through the openings in the partition walls without engagement of their shoulders with the margins of those openings. To accomplish this end there is provided over each of the openings for the passage of the bottles a bar 147 (see Fig. 10) pivoted to the partition wall at its inner end and extending through the lateral walls of the respective compartments. The outer ends of the respective bars extend over the shaft 124 where they are operatively engaged by cams 148, mounted on the shaft 124. Each of the bars 147 is provided with a curved lip 149, extending downwardly over a portion of the openings 37.

Figure 10:
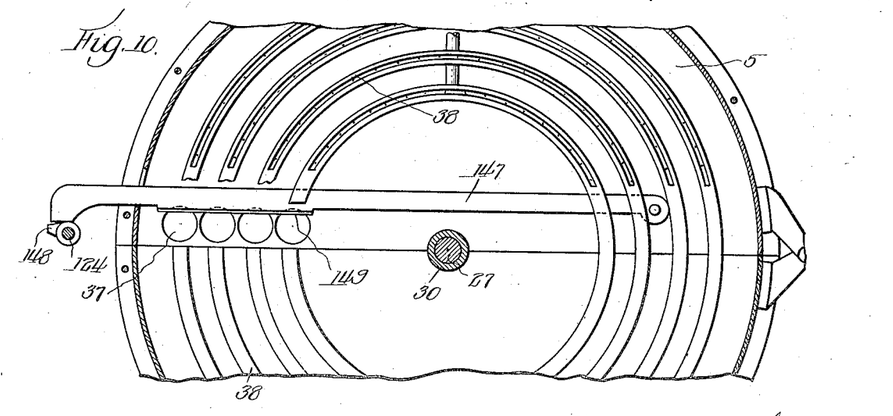
Fig. 10 is a cross sectional view through one of the compartments of the machine illustrating the inter-compartmental conveying control means.

As the bottles approach the opening 37 they slide from engagement with the retaining bars 38 into engagement with the curved lips 149 on the bars 147 with the effect that they are moved slightly inward and retained in the pockets until they have passed sufficiently by the margins of the openings as not to be engaged thereby when released. The cams 148 on the shaft 124 are so timed that when the bottles are positioned centrally of the openings 37, the bar 147 is quickly raised and the bottles released thereby for passage through the openings into the next compartment.

I claim as my invention:

1. In a machine of the class described, in combination, an elevating conveyor having spaced bottle carriers adapted to laterally receive and elevate bottles, an endless belt adapted to convey bottles to said elevating conveyor, a stationary plate positioned in extension of the operative run of said conveyor and adjacent to the path of said bottle carriers, a lever pivotally mounted beneath said plate, a plurality of prongs operatively supported by said lever and protruding upward through openings in said plate, a sprocket operatively engaged with said elevating conveyor, and a cam rigidly related to said sprocket, said cam being adapted to engage said lever and operatively withdraw said prongs beneath said plate coincidently with the approach of said bottle carriers successively to said plate.

2. In a machine of the class described, unloading mechanism for a wheel revolubly mounted in a casing adjacent an end wall thereof, said wheel having a plurality of inclined pockets, said wall normally retaining the bottles in said pockets and having an opening for the passage of the bottles therefrom outwardly from said casing, comprising a revolubly mounted member having radially extending chambers with outwardly open ends, said member being intermittently operable to successively present said chambers in register with said openings coincidently with the successive passing in register therewith of said pockets, said chambers being adapted to receive the bottles discharged from said pockets, an arcuate retaining wall positioned concentrically to said revoluble member adapted to retain the bottles in said chambers until swung into upright position by the rotation of said member, and a conveyor positioned to receive the bottles from said chambers.

3. In a machine of the class described, having a tank and a wheel revolubly mounted therein having a plurality of inclined pockets adapted to convey bottles to be washed, one of the side walls of said tank being positioned adjacent said wheel and having an opening therethrough for the discharge of the bottles from said pockets in intermittent groups, in combination, a continuously operating conveyor, a revoluble member mounted outwardly of said wall having a plurality of bottle receiving chambers, said member being intermittently operable to move said chambers successively into position to receive the groups of bottles discharged through said opening coincidently with the successive passage of said pockets into register with said opening, said member effecting the swinging of said bottles into upright position upon said conveyor, and a plurality of spaced wings normally removed from said conveyor and intermittently operable into position between said bottles over said conveyor coincident with the deposit of the bottles thereupon.

4. In a machine of the class described, having a tank with an opening in an end wall thereof, and having means within said tank for intermittently discharging bottles in groups through said opening, in combination, a revoluble member mounted outwardly of said wall having a plurality of bottle receiving chambers, said chambers being endwardly and laterally open, a conveyor positioned beneath said member, means for intermittently operating said member to move said chambers successively into position to receive the groups of bottles discharged from said opening and move them downwardly for deposit upon said conveyor, means for retaining the botles in said chambers while being moved from said opening to said conveyor, and a plurality of spaced wings operatively mounted adjacent said conveyor, said wings being operable into position over said conveyor for the lateral support of said bottles coincident with their deposit on said conveyor and immediately withdrawable therefrom to permit the movement of said bottles laterally from said chambers.

5. In a machine of the class described, in combination, a conveyor belt positioned for operation in substantially vertical direction, a bottle carrier mounted on said belt having lateral and bottom walls adapted to support a bottle received therein, said lateral and bottom walls respectively having outwardly opening slots formed therein, a stationary plate positioned adjacent the lower end of the upward path of travel of said carrier and having a tongue extended therefrom in position for register with said slot in the bottom wall of said carrier, said plate and tongue being adapted to support a bottle to be received by said carrier in its passage thereby, and a slide positioned adjacent the upper end of the downward path of travel of said carrier and having a tongue extending therefrom in position for register with said slot in the lateral wall of said carrier, said slide and tongue being adapted to receive a bottle from said carrier in its passage thereby.

6. In a machine of the class described, in combination, a continuously operable conveyor, an intermittent means for depositing a plurality of bottles upon said conveyor, and a plurality of spaced wings normally removed from said conveyor and intermittently operable into position between said bottles over said conveyor coincidently with the deposit of said bottles thereupon.

In testimony whereof, I have hereunto affixed my signature.

IRVING R. HIPPENMEYER.